(12) United States Patent
Chen et al.

(10) Patent No.: US 6,745,267 B2
(45) Date of Patent: Jun. 1, 2004

(54) MULTI-FUNCTIONAL MINI-MEMORY CARD SUITABLE FOR SFMI AND USB INTERFACES

(75) Inventors: Chia Li Chen, Taipei (TW); Hsiang An Hsien, Taipei (TW)

(73) Assignee: Carry Computer Eng. Co., Ltd., Hsin Tien (TW)

(*) Notice: Subject to any disclaimer, the term of this patent is extended or adjusted under 35 U.S.C. 154(b) by 60 days.

(21) Appl. No.: 10/244,833

(22) Filed: Sep. 17, 2002

(65) Prior Publication Data

US 2004/0030818 A1 Feb. 12, 2004

(30) Foreign Application Priority Data

Aug. 9, 2002 (TW) ........................ 91117943 A

(51) Int. Cl.[7] ................. G06F 13/14; G06F 13/16
(52) U.S. Cl. ............... 710/74; 710/36; 710/301; 711/100; 711/168; 711/173
(58) Field of Search ............... 710/36, 74, 301; 711/100, 168, 173

(56) References Cited

U.S. PATENT DOCUMENTS 6,247,078 B1 * 6/2001 Ebert et al. ............ 710/301
6,341,964 B1 * 1/2002 Yu ........................ 439/79
6,385,677 B1 * 5/2002 Yao ....................... 711/115
6,418,501 B1 * 7/2002 Gama et al. ............ 710/305
6,457,648 B1 * 10/2002 Chen et al. ............. 235/486
6,644,979 B2 * 11/2003 Huang .................... 439/65

* cited by examiner

Primary Examiner—Rehana Perveen

(57) ABSTRACT

A multi-functional mini-memory card serves for storing data and support data input and output. The multi-functional mini-memory card comprises a memory card I/O functional module; a memory for storing data; and a main controller connecting between the memory card I/O functional module and the memory. The input/output port of the multi-functional mini-memory card have eight joints, four of the eight joint is used for USB interface, and all eight joints are used for an SFMI interface. The power source joint and ground joint of the SFMI interface are identical to the power source joint and the ground joint of the USB interface, respectively. A multi-functional mini-memory card slot has eight joints, wherein four of the eight joints are suitable for USB interface and all the eight joints suitable for an SFMI interface. The joint may be male joint or female joint.

12 Claims, 9 Drawing Sheets

| No. | Name | Description |
|---|---|---|
| 1 | VCC | D. C. Power source |
| 2 | D0 | Bidirectional instruction / data / status bus bit 0<br>D- in USB interface |
| 3 | D1 | Bidirectional instruction / data / status bus bit 1<br>D+ in USB interface |
| 4 | GND | Ground |
| 5 | D2 | Bidirectional instruction / data / status bus bit 2 |
| 6 | D3 | Bidirectional instruction / data / status bus bit 3 |
| 7 | CLK | Clock signal |
| 8 | BD_CD | Memory card insertion detection signal |

| No. | Name | Description |
|---|---|---|
| 1 | VCC | D. C. Power source |
| 2 | D0 | Bidirectional instruction / data / status bus bit 0<br>D- in USB interface |
| 3 | D1 | Bidirectional instruction / data / status bus bit 1<br>D+ in USB interface |
| 4 | GND | Ground |
| 5 | D2 | Bidirectional instruction / data / status bus bit 2 |
| 6 | D3 | Bidirectional instruction / data / status bus bit 3 |
| 7 | CLK | Clock signal |
| 8 | BD_CD | Memory card insertion detection signal |

Fig. 2

| Class | Name | Code | Description |
|---|---|---|---|
| PID | OUT | 0001 | The electronic application device will output data. |
| PID | IN | 1001 | The electronic application device will input data. |
| PID | SETUP | 1101 | The electronic application device sets control endpoints or acquires related data. |
| PID | ACK | 0010 | The receiving end assure that data receiving is correct. |
| PID | NAK | 1010 | The receiving end can not input or output data temporarily. |
| PID | STALL | 1110 | The endpoint stops work or does not support an instruction. |

Fig. 5

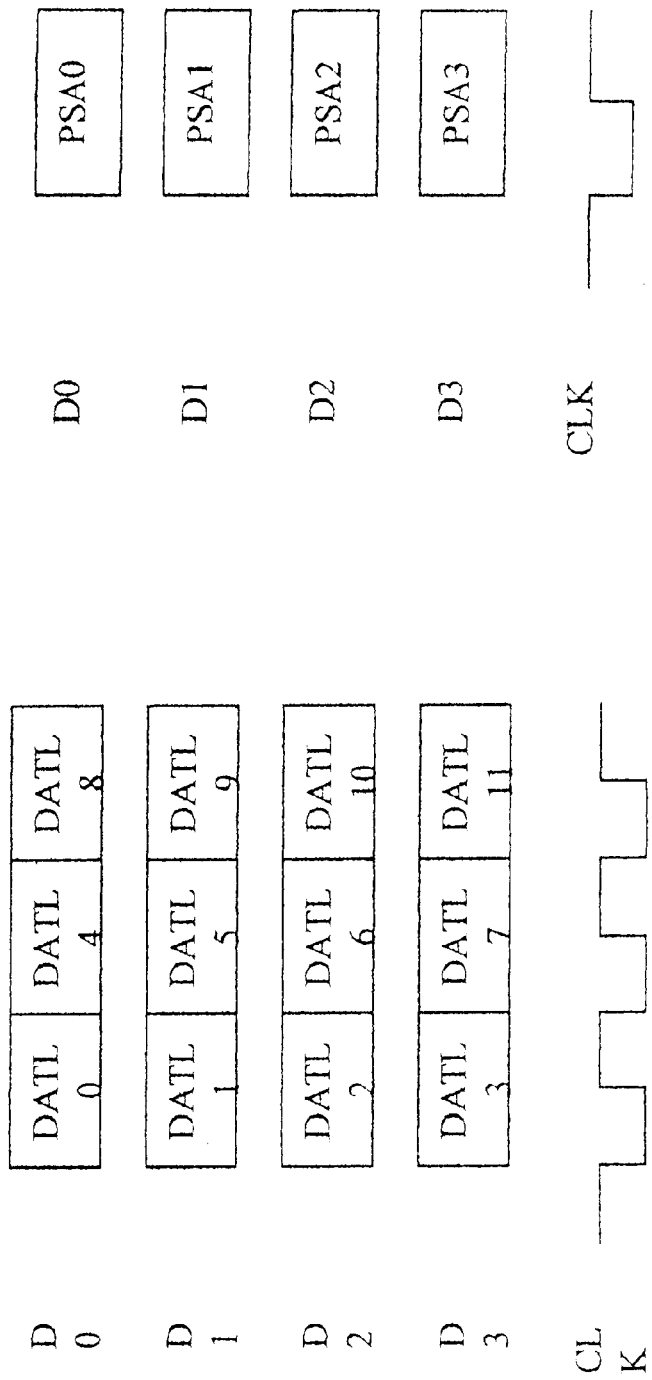

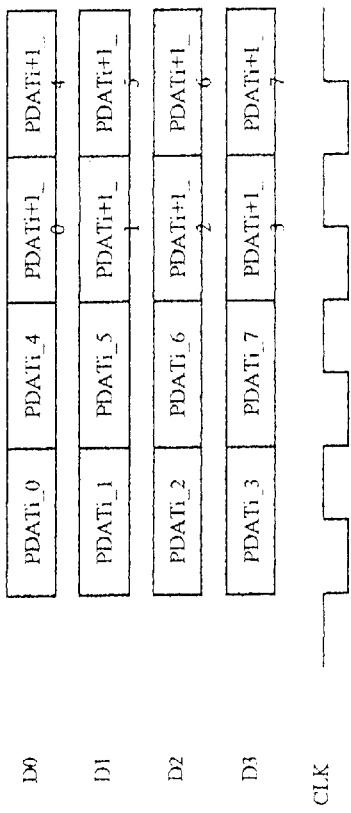
Fig. 9 Data transmission order
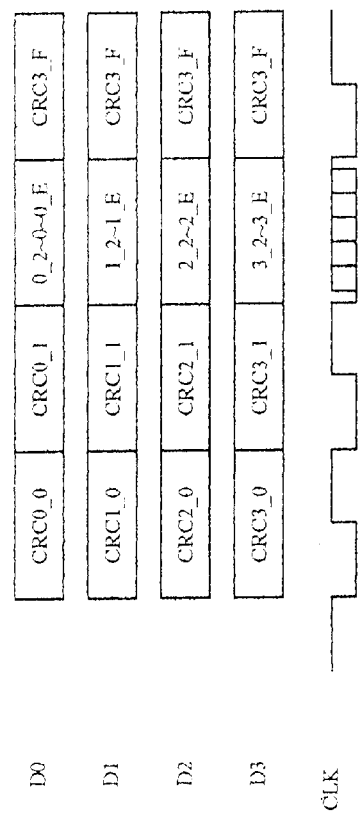
Fig. 10 Error check code

MULTI-FUNCTIONAL MINI-MEMORY CARD SUITABLE FOR SFMI AND USB INTERFACES

FIELD OF THE INVENTION

The present invention relates to memory card interfaces, and particularly to a multi-functional mini-memory card which is suitable for USB interface and SFMI interface.

BACKGROUND OF THE INVENTION

Small form factor memory card has a large amount of storage space and has erasable memory as storage medium. The Small form factor memory card is built in with a controller for controlling chipset therein and reading and writing data. In application, the Small form factor memory card is connected to an electronic application device compatible with the Small form factor memory card.

The Small form factor memory card has the advantages of small volume, light weight, high speed, power saving, etc., and thus are widely used in computer periphery device and other electronic applications for data storage and exchange. The current used Small form factor memory card includes CompactFlash cards (CF cards), SmartMedia cards (SM cards), MultiMedia cards (MMC cards), MemoryStick cards (MS cards), Secure Digital cards (SD cards), etc. These cards have different sizes, appearances, mechanical structures, electronic contacts, communication protocols, software instructions, control processes, etc.

The Small form factor memory card are widely used in portable digital devices, such as mobile phones, digital cameras, MP3s, PDAs, etc. Other than being used in memory card, they are used in such as modem cards of CF interface, network cards, digital camera cards with memorystick interface, BlueTooth communication cards, etc. To identify with memory cards, above mentioned cards are called as IO cards.

Above mentioned Small form factor memory cards have some disadvantages which will be described in the followings.

For CompactFlash cards, there are 50 joints are necessary in the interface. The electric interface has 8 bits and 16 bits which are used in parallel. The CompactFlash has an address but 26 signals and a variety of control signal wires for different uses.

The defect of CompactFlash is that too many joints are used so that cost is high and a larger space is necessary; a larger force is needed for insertion and withdrawing the cards; the positioning of the pins are not accurate so that the slot is easily damaged; a parallel design must provide selection signals if a plurality of cards are used and thus it is not suitable to be connected with a plurality of cards; no write protection is provided and thus it can not assure that the contents of the memory is correct.

The SmartMedia cards need 22 joints. Reeds and plane contact terminals are used. Two reeds are necessary for detecting whether a memory card is inserted and write protection piece is adhered.

The detect of the SmartMedia is that too many joints and write protection piece induce a larger space is necessary and thus cost is high; the terminals are arranged as two banks. In insertion or withdrawing, the contacts in the first bank will be connected to the contracts in the second banks, thereby, the insertion is unstable; the power signal VCC and ground pin GND are arranged between the two connecting terminals, it is possible that the terminal is short or unstable; the write protection of the memory card is identified by adhering a tap, and thus special conduction write protection tap must be provided; the physical addressing is used and thus linear logic used in the general system can not be supported directly so that the cost of the electronic application device is increased; the expansion of the storage medium causes that the format must be modified to suit the format of the shipset due to the physical addressing.

For MMC card, the interface has seven joints. Reeds and plane contact terminals are used. A further reed is used to detect the insertion of a memory card.

The defect of MMC card is that the serial communication transfer mode is used, and thus only one bit is used in each clock. Thereby, the transmission rate is low; the write protection must be used with special software.

For SD cards, the interface needs 9 joints, reeds and plane contact terminals are used. Moreover, two reeds are used to detect whether a memory card is inserted and detect the sliding block of writing protection.

The defect of SD interface card is that the sliding block must be detected by an electronic application device.

For MS card, the interface of MS card has ten joints, and reeds and plane contact terminals are used. The connecting interface has card inserting detection signals. The memory card has a write protection switch. The advantage of the memory card is that it can support the write protection function.

The defect of the MS interface card is that the serial communication transfer mode is used, and thus only one bit is used in each clock; the physical addressing is used and thus linear logic used in the general system can not be supported directly so that the cost of the electronic application device is increased; the expansion of the storage medium cause that the format must be modified to suit the format of the shipset due to the physical addressing.

Since above mentioned prior art Small form factor memory cards have defects as described above, and personal computers must expand with USB interface, PCMCIA interface, or IDE interface, etc., for communicating with these interface cards. Thereby, the operation is inconvenient and the cost is high.

SUMMARY OF THE INVENTION

Accordingly the primary object of the present invention is to provide a multi-functional mini-memory card which can be used to support USB interface and SFMI interface. The multi-functional mini-memory card has eight pins for being used SFMI interface and also used for USB interface. Thereby, the multi-functional mini-memory card of the present invention can be used in electronic application devices which is compatible for SFMI interface of the present invention and general used USB interface. Thereby, no adaptor is necessary. The present invention can directly communicate with electronic application devices and computer devices with USB interface.

To achieve above object, the present invention provides a multi-functional mini-memory card for storing data and support data input and output. The multi-functional mini-memory card comprises a memory card I/O functional module for inputting and outputting data; a memory for storing data; and a main controller connecting between the memory card I/O functional module and the memory for controlling the operation of the memory card I/O functional module and the memory. The input/output port of the multi-functional mini-memory card have eight joints, four of the eight joint is used for USB interface, and all eight joints are used for an SFMI interface. The four joints used to USB interface include a power source joint (Vcc), a ground (GND) joint, two data transfer joints (D+ and D−). The eight joints used in SFMI interface includes a power source joint (Vcc), a ground (GND) joint, four data transfer joints (D0, D1, D2, and D3), a clock joint (CLK) and a memory card insertion signal detection joint; wherein the power source joint and ground joint of the SFMI interface are identical to the power source joint and the ground joint of the USB interface, respectively.

The present invention further provide a multi-functional mini-memory card slot having eight joints, wherein four of the eight joints are suitable for USB interface and all the eight joints suitable for an SFMI interface. The joints may be male joints or female joints.

The various objects and advantages of the present invention will be more readily understood from the following detailed description when read in conjunction with the appended drawing.

BRIEF DESCRIPTION OF THE DRAWINGS

FIG. 2 shows the definitions and functions of the pins of the SFMI interface of the present invention.

FIG. 4A shows the condition of the coupled SFMI interface and FIG. 4B shows the condition of the coupled USB interface.

FIG. 5 shows the contents of the package identification codes in the present invention.

FIG. 8 shows the relation of the data length and the clock of the data structure according to the present invention.

FIG. 9 shows the relation of the data transmission order and the clock of the data structure according to the present invention.

FIG. 10 shows the relation of the structure of the error checking code and the clock of the code according to the present invention.

FIG. 11 shows the relation of the structure of the package status codes and the clock of the code in the present invention.

DESCRIPTION OF THE INVENTION

In the SFMI card of the present invention will be described. At first, we described the hardware structure suitable for the SFMI card according to the present invention. Then the communicational protocol of the SFMI card of the present invention will be stated.

The multi-functional mini-memory cards of the present invention are mainly classified as two kinds. One serves for storing digital information, and the other serves for supporting other input/output function. The two functions are necessary to be prepared.

The main controller 220 serves for storing digital information. The main controller 220 must have a control interface (such as PROM, EPROM, EEPROM, Flash memory). For the I/O function, the multi-functional mini-memory card 200 must have a control interface for supporting I/O function. For storing digital information, the system must have a large capacity memory. For supporting I/O function, the system must have an I/O function module.

Figure 1:
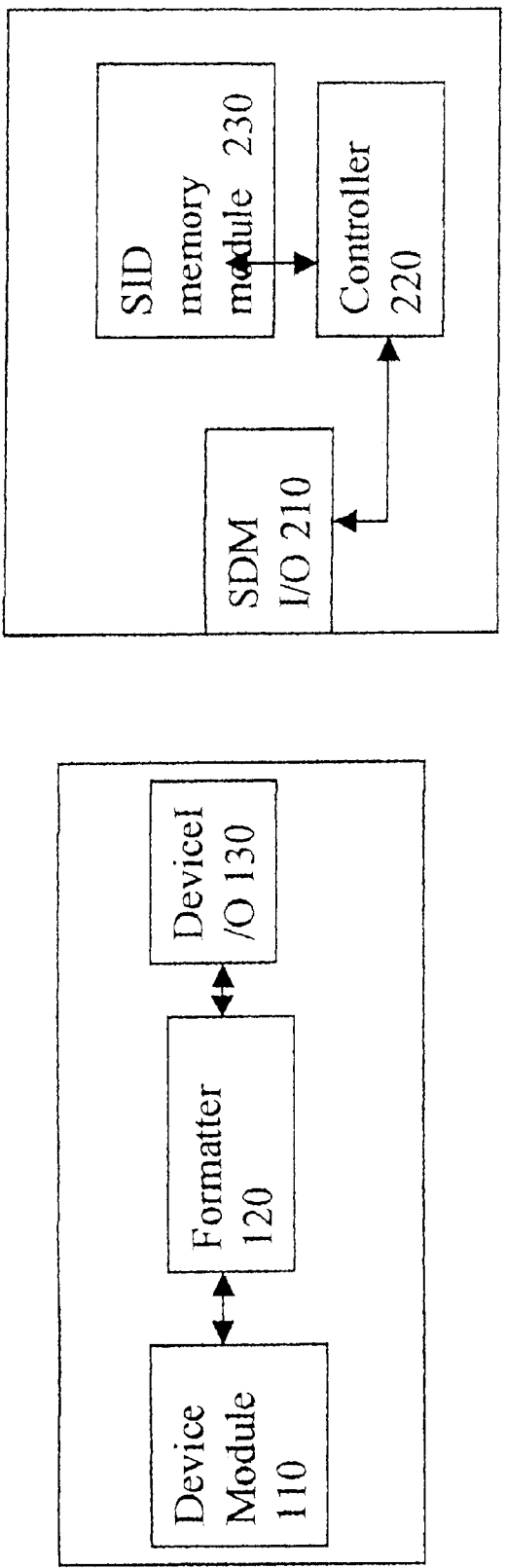
FIG. 1 shows a basic structure of the multi-functional mini-memory card and the electronic application device according to the present invention.

Referring to FIG. 1, the multi-functional mini-memory card according to the present invention is illustrated. The multi-functional mini-memory card 200 includes a memory card I/O functional module 210, a main controller 220, and a memory 230. Then the circuit element are integrated to a printed circuit board. The printed circuit board is provided with terminal of the multi-functional mini-memory card, which is exposed out for being connected to an electronic application device 100. Finally, the printed circuit board is enclosed within a casing so as to form a complete multi-functional mini-memory card or I/O card. The electronic application device 100 connected to the multi-functional mini-memory card 200 includes a device module 110, a format converter 120, and a device I/O 130.

The memory card I/O functional module 210 is a function module for data input and output and is a circuit with connecting terminals. The multi-functional mini-memory card 200 of the present invention can support USB interface and SFMI interface of the present invention. Therefore, the terminals are compatible with a matched terminal of four pins and eight pins.

A four pin terminal is used in a basic USB interface, and includes a Vcc pin for providing DC current to the multi-functional mini-memory card from a connected electronic application device, a GND pin (ground pin) for providing a grounding protection and reference potential, a D+and a D−pins for data transfer.

The multi-functional mini-memory card has a further design of 8 pins, which includes 4 bits bidirectional instruction/data/status bus (D0 to D3), a pulse synchronous signal (CLK), a system interface and memory card insertion detecting signal (CD), a power pin (Vcc) and a ground pin (GND). Totally eight pins are necessary. The write protection is determined by a write protection device built in the multi-functional mini-memory card 200 and the message is informed to the electronic application device 100 through a communication interface. The Vcc is a DC power joint for providing DC current to the multi-functional mini-memory card so as to enable the multi-functional mini-memory card 200. The GND is a ground pin for providing pin protection and reference potential. CLK are pulse synchronous signal for providing synchronous pulse to input and output data so as to reconstruct the signal time sequence and align the data. BD_CD is memory card insertion signal detection pin for determining whether the input or output data are USB signals or SFMI signals.

D0 is the bit 0 of the bidirectional instruction/data/status bus. In USB mode, it is the D− signal line. D1 is the bit 1 of the bidirectional instruction/data/status bus. In USB mode, it is the D+ signal line. D2 is the bit 2 of the bidirectional instruction/data/status bus and no corresponding bit in USB interface. D3 is bit 3 of the bidirectional instruction/data/status bus and there is no corresponding bit in USB interface.

From above description, it is appreciated that the SFMI interface of the present invention has four pins which are commonly used in the USB interface, that is: Vcc, GND, D− (D0), and D+ (D1). Moreover, the present invention further includes pins of CLK, BD_CD, D2 and D3. Thereby, in the insertion structure (including inserting end and slot), the four extra pins can be arranged among the original four pins so that the terminal of USB interface is compatible to the SFMI interface of the present invention. No other insertion structure is necessary.

Another feature of the present invention is that in the four pin bidirectional bus, when the electronic application device 100 has an USB interface memory card. The D0 and D1 are acted as a USB interface signals. Thereby, the present invention can be used with a personal computer without any extra adaptor.

Figure 3:
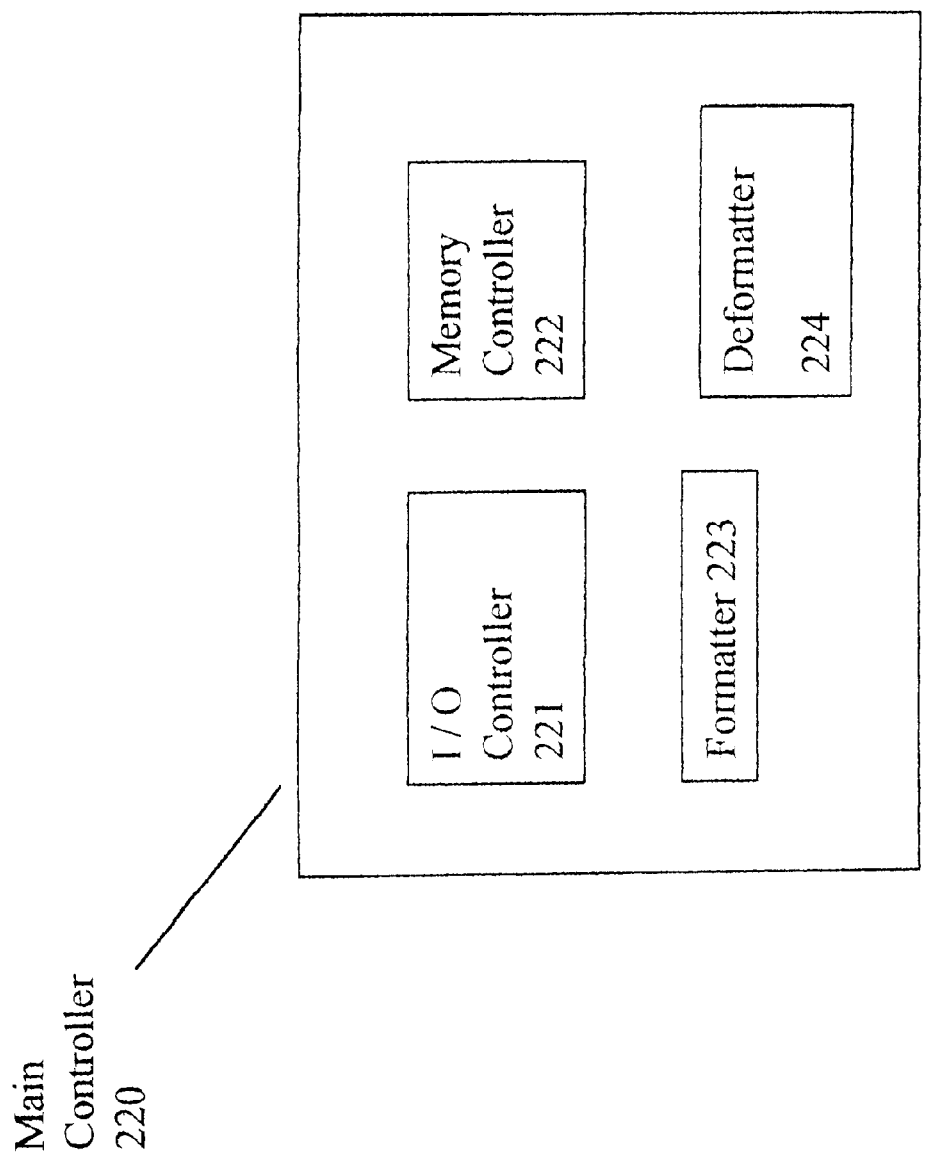
FIG. 3 shows a basic structure of the main controller of the present invention.

Further referring to FIG. 3, the main controller 220 is mainly formed by four components, which are an I/O controller 221, a memory controller 222, a formatter 223, and a deformatter 224. The main controller 221 serves for controlling memory card I/O functional module 210, including to determine the operation mode of the memory card I/O functional module 210 to be operated in input mode or in output mode, or to determine whether the electronic application device is operated under SFMI interface mode or USB interface mode. The memory controller 222 serves to control the memory 230. The formatter 223 serves to transfer data into USB format or SFMI format; and the deformatter 224 serves to deformat data of USB format or SFMI format so as to match the operation mode of the memory card I/O functional module. The operation of the formatter 223 and deformatter 224 will be further described in the following.

System Interface and Memory Card Insertion Detection Signal

The memory card insertion detection signal is a control signal for determining the input interface of the connected electronic application device. One end of the multi-functional mini-memory card is connected to the power source of the electronic application device 100. Thereby, the multi-functional mini-memory card can determine whether an electronic application device 100 is inserted.

The interface detection circuit of the memory card I/O functional module 210 includes a power source 310, a BD input detection end 320, a CD output detecting end 330, a first diode 360, a second diode 370, a first resistor 340, and a second resistor 350.

The function of the memory card I/O functional module 210 may determine the input interface is a USB interface and a SFMI interface by determining whether the BD input detection end 320 and CD output detecting end 330 have signals.

The multi-functional mini-memory card is connected to the electronic application device 100. When the multi-functional mini-memory card 200 is actuated, the CD output detecting end 330 is retained in high impedance so as not to affect the detection of the device module and CD output detecting end. When BD input detection end 320 and CD output detecting end 330 are detected, if BD and CD are in high level, then the system know SFMI interface being used, and vice versa.

Figure 4A:
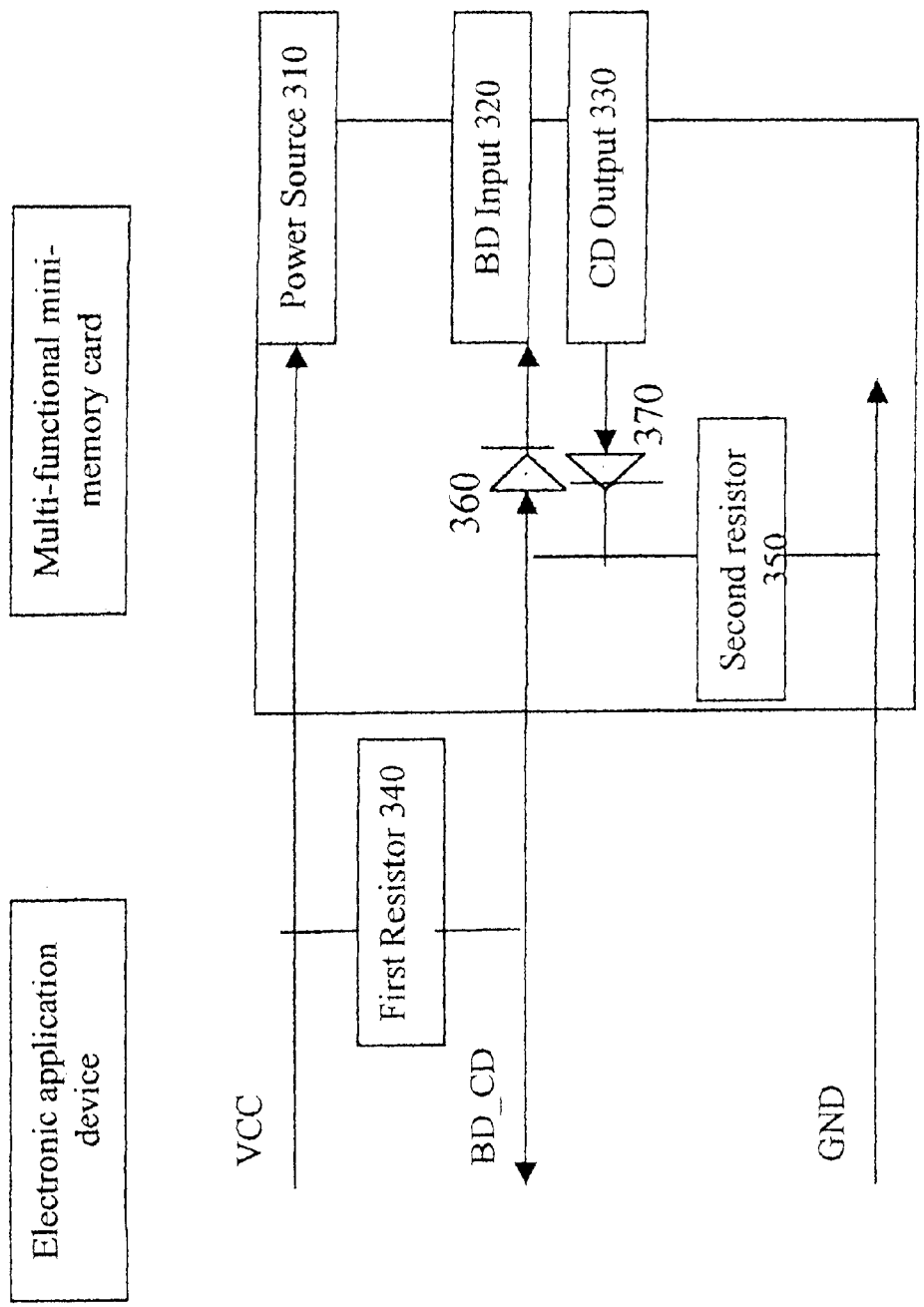
FIGS. 4A–4B show the circuit element arrangement of the detecting circuit in the present invention, where
Figure 4B:
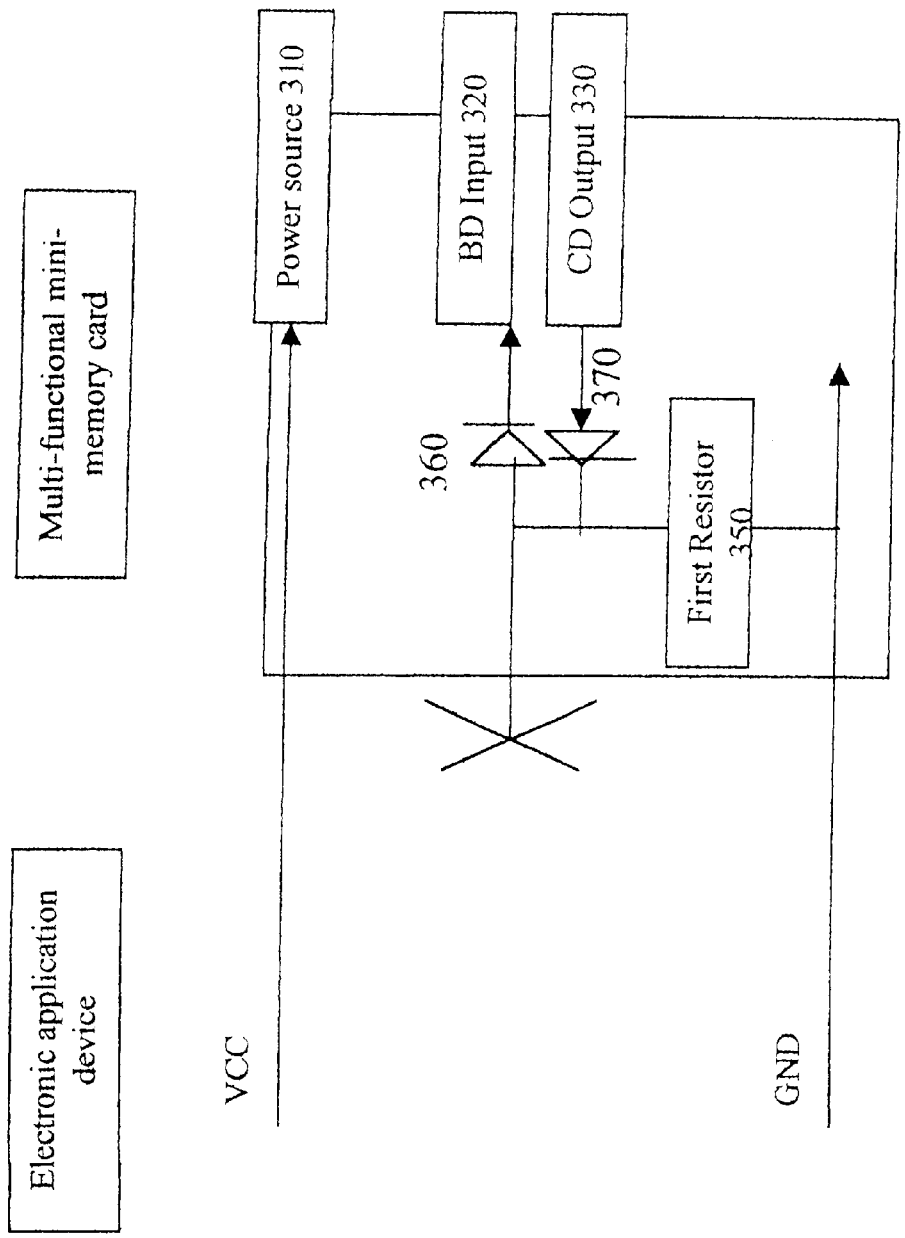

Referring to FIG. 4, the Vcc is connected to the power source 310. The system interface and memory card insertion detecting signal BD_CD is connected to the BD input detection end 320 through the second diode 370 which is connected positively. Moreover, the system interface and memory card insertion detecting signal BD_CD is connected to the CD output detecting end 330 through the second diode 370 which is negatively connected. The system interface and memory card insertion detecting signal BD_CD is connected to the ground end GND through the second resistor 350. A first resistor 340 is connected between the Vcc and memory card insertion detecting signal BD_CD. In the drawing, the first resistor 340 is 10Kω and the second resistor 350 is 100KΩ. These are only one example of the present invention. Other suitable values achieving the same effect can be used in the circuit without confining the scope and spirit of the present invention. The functions of the first resistor 340 and second resistor 350 serve to boost the BD_CD and Vcc so that the circuit can be operated in a desire way.

When a USB interface is inserted into the multi-functional mini-memory card 200, referring to FIG. 4A, the first diode 360 will conduct so that the BD input detection end 320 conduct. Thereby, the system knows the input interface is an SFMI interface. On the contrary, when no input is inputted to the system interface and memory card insertion detecting signal BD_CD, the second diode 370 is not conducted, and thus the system knows that the input signal is from a USB interface.

Moreover, in output mode, when the output signal is SFMI interface signals, the second diode 370 will conduct. Therefore, the system knows that the input signal is from an SFMI interface. Otherwise, it is from USB interface.

Communication Protocol of the Multi-functional Mini-memory Card

The data flow of the multi-functional mini-memory card of the present invention is semi-duplex, four bits bitstreams. A CLK signal is used as a base clock. Each clock has four bits being transferred. The way of transferring information is controlled by the electronic application device. After the transmission instruction and length is determined, the data is sent. To improve the application of this interface and simplify the whole design, the packet is used as a unit in data transformation. The data source or sink is from the endpoint indicated in the memory card based on the assignment of a communication protocol.

The memory card or IO card of the multi-functional mini-memory card at least supports a set of communication endpoints called as control endpoint with an address of 0. The electronic application device acquires the details of the memory card or IO card from this control endpoint so that it can know the function and communication performance.

(1) Start Bit/End Bit

After the electronic application device 100 and memory card 200 determine to transfer data, the foremost of the package is generated with initial bits of 0 for each D0 to D3 at each clock. The distal end of the package is added with 1s at the end bits of D0 to D3 with a period of two clocks.

(2) Packet Identifier (PID)

Referring to FIG. 5, the communication package is started from package identification codes (PIDs). The different identification codes are described different conditions of the packages. Each package includes (1) package identification codes indicating the direction of data transfer, the address of the endpoints, and length of the data; (2) payload data including a set of CRC data error detecting code; (3) an acknowledge code by which the correction of data transfer can be known from the receiving end. The package identification code of 0001 represent that a data transfer is actuated. The package identification code of 1001 indicates that electronic application device will input data. The identification code of 1101 indicates that the electronic application device will set control endpoints or acquired related data. The package identification code of 0010 indicates that data transfer is complete at the receiving end. The package identification code of 1010 indicates that the receiving end cannot receive data or data cannot be sent. The package identification code of 1110 indicates that the communication endpoint stops to work or the communication endpoint does not support the control instruction.

The PID identification code has four bits. To prevent mistake in communication, four reverse bits are added after the four identification codes. Thereby, there are eight codes which are sent in two clocks, as shown in the FIG. 6. When the receiving end determines that the receiving data is corrected, that is PID and PID' (reverse PID) are connect and PID=(PID')'.

(3) Endpoint

The communication endpoints are basic units which supports the data transfers between the multi-functional mini-memory card or IO card and the electronic application device. With respect to the endpoints, in the multi-functional mini-memory card or IO card, a data buffer of a specific capacity is formed for storing payload data of the communication package in the communication of the electronic application device and the multi-functional mini-memory card.

The multi-functional mini-memory card or IO card supporting the multi-functional mini-memory card has at most 16 endpoints which is indicated as a package transfer object by the address of the endpoint in the communication package.

The multi-functional mini-memory card or IO card supporting the multi-functional mini-memory card has at least one endpoint which has an address of 0. When the electronic application device detects that the multi-functional mini-memory card or IO card has been inserted through the interface thereof. The electronic application device acquires the identification codes, functions, the number of endpoints, address of each endpoint, and forms of the endpoints, etc. through the endpoint of 0.

The communication endpoint may be classified into four kinds which are suitable for different forms of data transfer between the electronic application device and the multi-functional mini-memory card or IO card.

Control endpoint: the multi-functional mini-memory card or IO card must have a control endpoint with address of 0. The function of the control endpoint is to get the identified code, function form, the number of the endpoints; addresses of the endpoints and the forms of the endpoints of the multi-functional mini-memory card when the multi-functional mini-memory card is actuated by the electronic application device.

Data input endpoint: by the data input endpoint, the electronic application device can input a large amount data from the multi-functional mini-memory card or IO card.

Data output endpoint: by the data output endpoint, the electronic application device can output a large amount data to the multi-functional mini-memory card.

Interruption input endpoint: by this interruption input endpoint, the multi-functional mini-memory card or IO card can request the electronic application device to periodically interrupt the data input from the multi-functional mini-memory card or IO card by setting of a period.

Figures 6, 7:
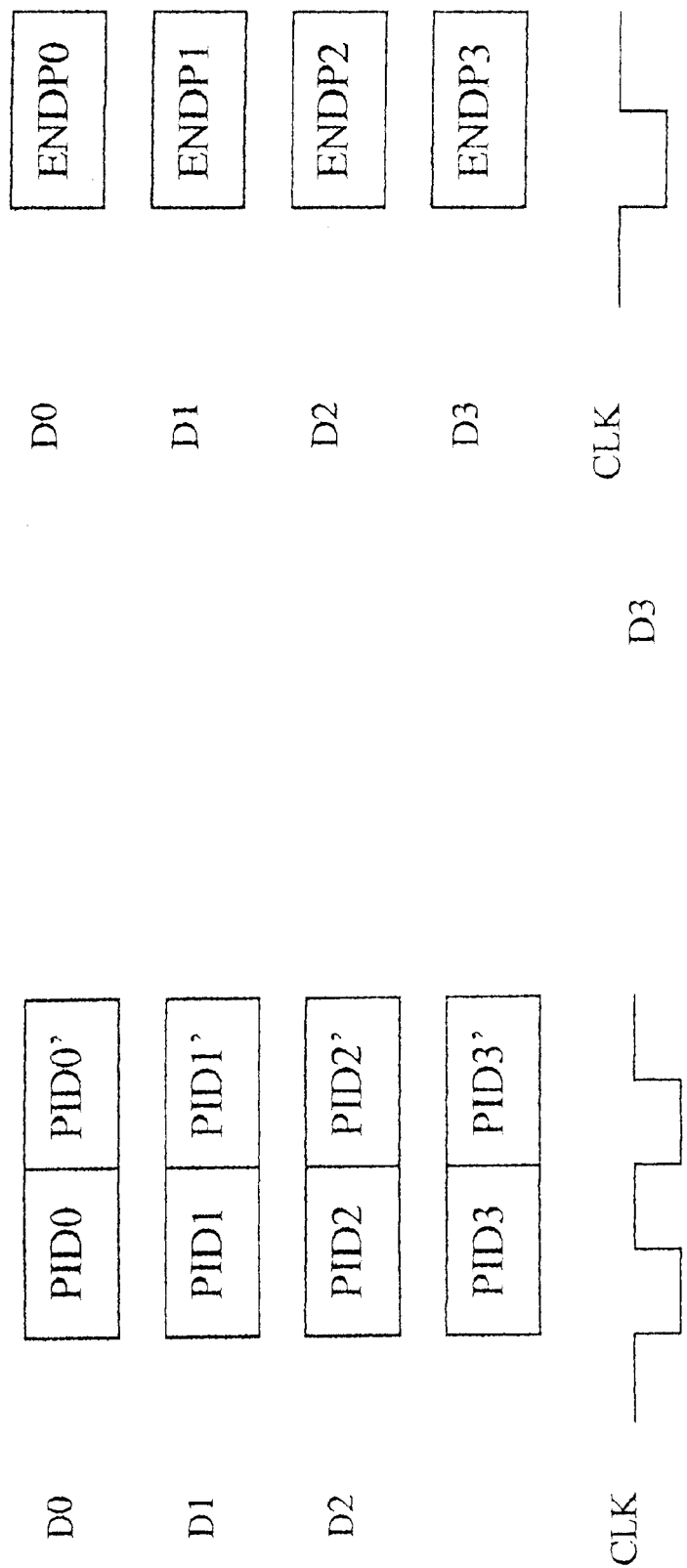
FIG. 6 shows the relations of the data structure of the package identification code and the clock of the data structure of the present invention.
FIG. 7 shows the relation of communication endpoint and the clock of the data structure in the present invention.

Referring to FIG. 7, the transfer indication package indicates the succeeding data package through the indication communication endpoints or indicated the corresponding communication endpoint of the state package. In the transfer indication package, the communication endpoint has four bits which is next to the PID and is executed through one clock.

(4) Data Length

Referring to FIG. 8, after the endpoint, 12 bits indicating data length is transferred, which is indicated by DATL. The DATL occupies one byte. 0×000 represents 4096 bytes to be transferred and the 0×001 represents one bit to be transferred.

(5) Payload Data

The payload data (PDAT) is the data to be transferred to the endpoint. DATL sets the data length of the payload. In transfer, each byte is transferred in two clock periods. The transfer direction is indicated in the package identified code of the electronic application device, as shown in FIG. 9. A cyclic redundant code of 16bit, CRC16, is used as an error check code and is added next to the payload data. The algorithm of CRC 16 is a divided-by-two division, preferably, it is a polynomial divided-by-two division with $G(X)=X^{16}+X^{15}+X^2+1$. The data transfer order is illustrated in FIG. 10.

(6) Packet Status Acknowledge

After the payload data has been received, the received end determines whether the error check code is correct and then determines whether the receiving data is correct. If yes, an ACK is transferred back. If the receiving process can not be finished temporarily or the check code shows that the display data is incorrect, then a NAK is transferred back. If the memory card has errors, or the instruction is not correct, then a STALL is transferred, as shown in the FIG. 11.

(7) Data Format

The transfer of the communication package is actuated by the electronic application device (or system end). The order of the data package is sequentially initiated bits, package identified codes, endpoints, data length, payload data, package state codes; data formats, end bits. Data transfer, generation of package identified codes, indication of endpoints; and data length are actuated by the system end If the package is an IN package, after the electronic application device receives the data. If the required data can not be generated immediately. A response of NAK of device state is actuated. Then the electronic application device stops the data transfer and the data transfer can be re-actuated at any time for getting the data package. If the electronic application device can transfer required data, then the electronic application device generates initial bits and then the data in the internal endpoint is transferred. Then the data satisfied to the DATL is transferred, and a CRC error check code of 16 bits is transferred. After the memory card receives the error check code and determines the transfer is correct, then an ACK signal is sent. If the data is incorrect, then a NAK is sent. Then the package can be sent again for transferring correct data.

If the package is an out or a setup package, after the receiving end has received the package identified codes, addresses of the communication endpoints, and data length. The data to be transferred is sent to the receiving end. After a data with a length equaling to the DATL is sent, a CRC error check code of 16 bits is transferred. After the memory card receives the error check code and determines the transfer is correct, then an ACK is sent. If the data is incorrect, then an NAK is sent. Then the receiving end determines whether the transfer process is needed to be restarted for acquiring correct data.

(8) Control Transfer Mode

The electronic application device can acquire data related to the multi-functional mini-memory card through an endpoint of 0 or set related functions. The control transfer mode can be classified into a SETUP stage, a DATA stage, a STATUS stage. The details will be described herein.

In setup stage, the transmitting end sent a SETUP package which includes SETUP package identified codes. The communication endpoint has an address of 0 and a DATL of 8 bytes. Next, the transmitting end sends a SETUP instruction code and parameter of 8 bytes and a CRC 16 of 2 bytes. Finally, the receiving end transfers a state code to inform the correctness of the package.

The SETUP instruction code and parameter of 8 bytes includes bmRequestType, bRequest, wValue, wIndex, wLength. The meaning is listed in the following table.

TABLE

Control transfer mode data format

| Shift address | Field name | Occupy space (byte) | Setting value | Description |
|---|---|---|---|---|
| 0 | BmRequest Type | 1 | Bit value | Instruction Form<br>D7: Data transfer direction<br>0 = From electronic application device output data to multi-functional mini-memory card<br>1 = From multi-functional mini-memory card outputs data to the electronic application device.<br>D6 . . . 5: Classes of instruction<br>0 = Standard instruction<br>1 = Proprietary instructions of device class<br>2 = Special instructions of manufacturer.<br>3 = Sustained.<br>D4 . . . 0: Instruction object<br>0 = Device itself<br>1 = Interface<br>2 = Communication endpoint<br>3 = Others<br>4 . . . 31 = Sustained. |
| 1 | bRequest | 1 | Setting value | Set instruction code (referring to the following table) |
| 2 | wValue | 2 | Setting value | The setting value is based on the instruction code and has a length of two bytes. |
| 4 | wIndex | 2 | Index value | The setting value is based on the instruction code and is used for index value or shift value. |
| 6 | wLength | 2 | Value | Setting data length |

Other than the standard code, the device class proprietary instructions and the manufacturing special instructions are determined by the device or the manufactures itself. The multi-functional mini-memory card or IO card supporting the multi-functional mini-memory card must support the standard instruction codes. The meaning of the standard instruction code:

TABLE 2

Standard Instruction Code Table

| bmRequest Type | bRequest | wValue | wIndex | wLength | Data |
|---|---|---|---|---|---|
| 00000000B<br>00000001B<br>00000010B | CLEAR_FEATURE | Feature Selector | 0 | 0 | No |
| 1000000B | GET_CONFIGURATION | 0 | 0 | 1 | Configuration setting value |
| 1000000B | GET_DESCRIPTOR | Describing bit and index value | 0 or language code | Length of describing bits | Data of describing code |
| 10000001B | GET_STATUS | 0 | 0 interface code endpoint code | 2 | Acquiring endpoint stats of the device, interface or transfer endpoint. |
| 0000000B | SET_ADDRESS | Device address | 0 | 0 | No |
| 0000000B | SET_CONFIGURATION | Configuration setting value | 0 | 0 | No |
| 0000000B | SET_DESCRIPTOR | Describing class and index code | 0 or language code | Length of describing code | Describing bits |
| 00000000B<br>00000001B<br>00000010B | SET_FEATURE | Feature Selector | 0 interface code endpoint code | 0 | No |
| 00000001B | SET_INTERFACE | Alternate Setting | Interface code | 0 | No |

In data stage, the succeeding data transfer direction and length are determined according to the bRequest and wLength. The transmitting end actuates the data transfer and the data length is set by wLength.

After the data stage, in the status stage, the receiving end sends a status code to assure the data transfer is correct according to the transfer direction of data.

(9) Application of the Multi-functional Mini-memory Card

The multi-functional mini-memory card of the present invention can be used in various applications. In above description, only physical layer is covered, while no application layer is described. Only related instruction sets and communication protocols are confined, and thus the multi-functional mini-memory card of the present invention can be used in various storage devices, communication devices, and other related fields.

Although the present invention has been described with reference to the preferred embodiments, it will be understood that the invention is not limited to the details described thereof. Various substitutions and modifications are within the scope and spirit of the present invention.

What is claimed is:

1. A multi-functional mini-memory card for storing data and support data input and output, the multi-functional mini-memory card comprising:
   a memory card I/O functional module for inputting and outputting data;
   a memory for storing data; and
   a main controller connecting between the memory card I/O functional module and the memory for controlling the operation of the memory card I/O functional module and the memory; characterized in that:
      the input/output port of the multi-functional mini-memory card have eight joints, four of the eight joint is used for USB interface, and all eight joints are used for an SFMI interface;

the four joints used to USB interface includes a power source joint (Vcc), a ground (GND) joint, two data transfer joints (D+ and D−);

the eight joints used in SFMI interface includes a power source joint (Vcc), a ground (GND) joint, four data transfer joints (D0, D1, D2, and D3), a clock joint (CLK) and a memory card insertion signal detection joint; wherein the power source joint and ground joint of the SFMI interface are identical to the power source joint and the ground joint of the USB interface, respectively.

2. The multi-functional mini-memory card as claim in claim 1, wherein the main controller includes:

an I/O controller for controlling the memory card I/O functional module and having function of determining an operation mode of the memory card I/O functional module to be in an input mode or in an output mode or in SFMI operation mode or in USB operation mode;

a memory controller for controlling the memory;

a formatter for formatting formats of output data to be acceptable by a receiving end;

a deformatter for deformatting the data from the receiving data for storage.

3. The multi-functional mini-memory card as claim in claim 1, wherein two of the data transfer joints of the SFMI interface are identical to the two data transfer joints of USB interface.

4. The multi-functional mini-memory card as claim in claim 3, wherein the D0 is the bit 0 in the SFMI interface and is the D+ in USB interface; and the D1 is the bit 1 in the SFMI interface and is the D+ in USB interface.

5. The multi-functional mini-memory card as claim in claim 1, wherein after the memory card I/O functional module, main controller, and memory are integrated in the circuit board; the circuit board has terminals of the multi-functional mini-memory card interface for being connected to the electronic application device.

6. The multi-functional mini-memory card as claim in claim 1, wherein the circuit board is a printed circuit board.

7. The multi-functional mini-memory card as claim in claim 1, wherein the memory card I/O functional module has a detecting circuit for detecting a coupling interface to be a USB interface or an SFMI interface.

8. The multi-functional mini-memory card as claim in claim 6, wherein the detecting circuit includes a power source end, an input detecting end, an output detecting end, a first diode, a second diode, a first resistor, and a second resistor wherein Vcc is connected to the power source;

the memory card insertion detecting signal connected to an BD input detection end through the second diode which is connected positively;

the system interface and memory card insertion detecting signal is connected to a CD output detecting end through the second diode which is negatively connected;

the memory card insertion detecting signal is connected to the ground end through the second resistor; and a first resistor is connected between the power source end and memory card insertion detecting signal.

9. The multi-functional mini-memory card as claim in claim 1, wherein the memory is one of a DRAM, EPROM, EEPROM, and flash memory.

10. A multi-functional mini-memory card slot having eight joints, wherein four of the eight joints are suitable for USB interface and all the eight joints suitable for an SFMI interface.

11. The multi-functional mini-memory card slot as claim in claim 10, wherein each joint is a male joint.

12. The multi-functional mini-memory card slot as claim in claim 10, wherein each joint is a female joint.

* * * * *